R. MIOLLA.
UNIVERSAL TEST INDICATOR.
APPLICATION FILED APR. 4, 1921.
1,413,232.
Patented Apr. 18, 1922.
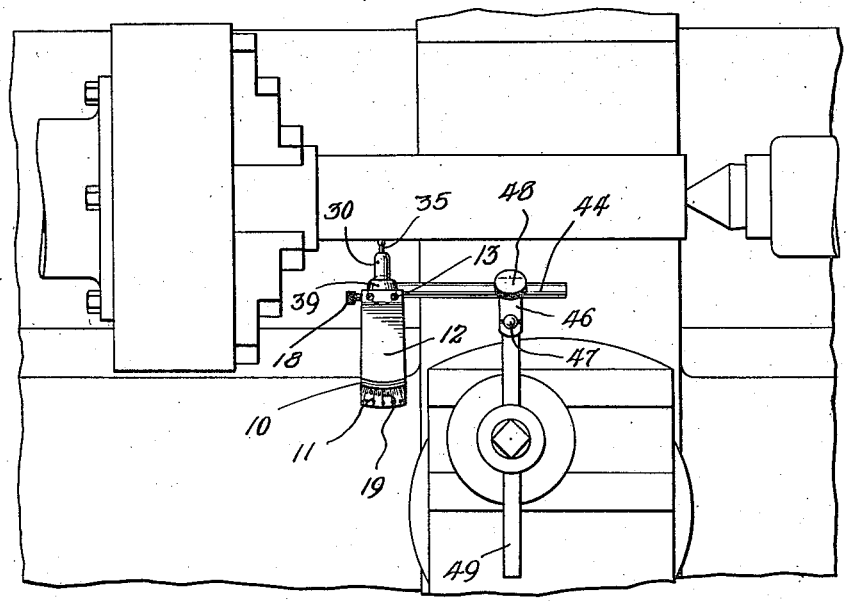
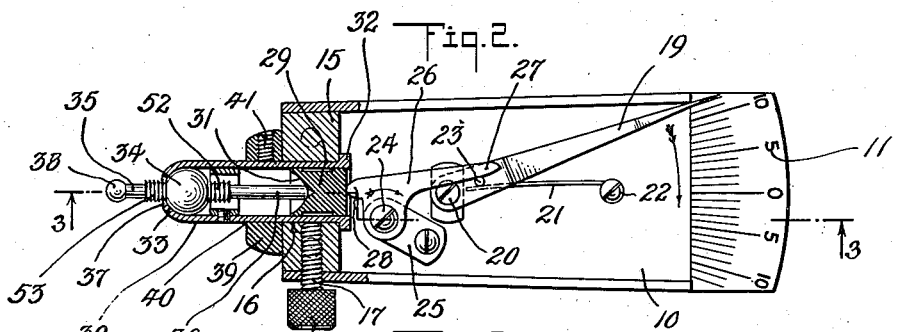
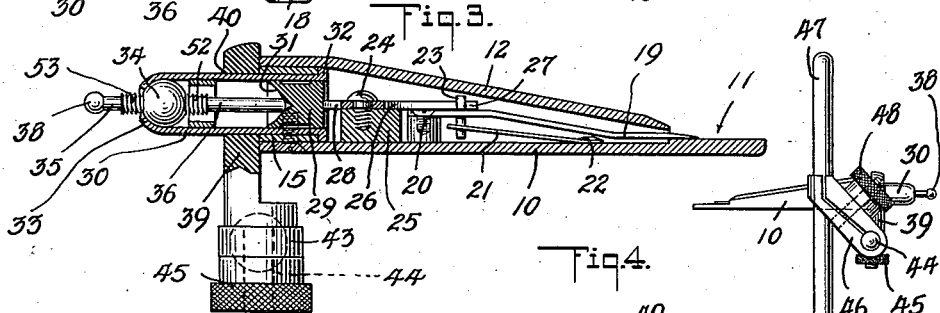
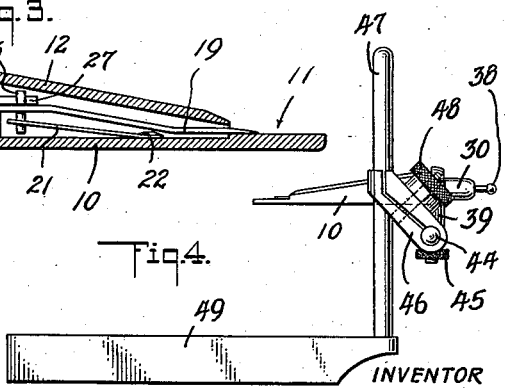
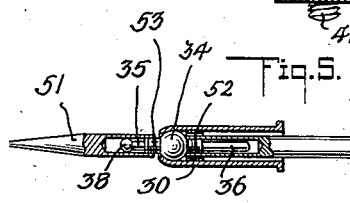
INVENTOR
R. Miolla
BY
Geo. W. Beeler
ATTORNEY

UNITED STATES PATENT OFFICE.

RALPH MIOLLA, OF MOUNT VERNON, NEW YORK.

UNIVERSAL TEST INDICATOR.

1,413,232.      Specification of Letters Patent.    Patented Apr. 18, 1922.

Application filed April 4, 1921. Serial No. 458,397.

*To all whom it may concern:*

Be it known that I, RALPH MIOLLA, a citizen of the United States, residing at Mount Vernon, in the county of Westchester and State of New York, have invented certain new and useful Improvements in Universal Test Indicators, of which the following is a specification.

This invention relates to instruments of precision, and has particular reference to instruments used by machinists or other similar artisans.

Among the objects of the invention is to provide an indicator for testing the adjustment of machines or work for determining the comparative sizes or surface irregularities of a job in connection with turning machines such as lathes, the accuracy in adjustment or rotation of a shaft or spindle around its axis or center, or other analogous uses familiar to those skilled in the art.

More specifically stated by this invention I provide a test indicator adapted for universal use, with respect to the direction of movement of the contact member, whether in the direction of its axis or movement thereof in any plane at an angle to said axis, for the operation of a pointer movable over a plate or dial, or whether it be used as a lathe test indicator in connection with the axis of a shaft, as well as for other analogous uses.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a plan view showing a diagrammatic representation of a portion of a lathe to which my improvement is applied and indicating its use as testing for the size or irregularities on or in the surface of a rotating job.

Fig. 2 is an enlarged longitudinal section of the principal parts of the improvement, some of the details being indicated in plan and in position assumed thereby when the device is idle.

Fig. 3 is a vertical longitudinal section on the line 3—3 of Fig. 2, the section being at right angles to that of Fig. 2.

Fig. 4 is an elevation of a portion of the device shown in Fig. 1 looking toward the left.

Fig. 5 is a partial plan and part sectional view of that adaptation of my invention for use as a lathe test indicator.

Referring to the drawings I wish it first of all to be understood that the instrument is adapted for practically unlimited or universal positions of adjustment with respect to the machine on or in connection with which it is to be used, as well as being universal in application to the job or jobs to be tested. Hence, it will be understood that the instrument may be set or held above, below, or at any side of a rotating piece of work to be tested or held supported in any suitable manner adjacent to a piece of work that is movable, either bodily or by reason of surface irregularities, laterally or at an angle to the axis of the contact member of the instrument. Irrespective, however, of the manner of support of the instrument or the direction of application of the job to said contact member, the pointer will always respond so as to indicate equal irregularities of thrust against said contact member.

More specifically my instrument comprises a casing 10 having a dial or plate 11 with an arc shaped series of graduation marks formed thereon and having any suitable character of identification, but indicated as starting at the midpoint or 0 and extending laterally therefrom on opposite sides. The extent of this arc may be as great as desired and might even in some instances be regarded as a dial. The casing includes also a cover plate 12 shown as secured in place by screws 13. In the end of the casing remote from the scale is a block 15 in which is formed a cylindrical hole 16, and tapped laterally through said block is a set screw 17, the axis of the screw being perpendicular to the axis of the hole. The screw may have any suitable head, but indicated herein as being a knurled finger piece 18.

A pointer 19 is pivoted at 20 within the casing, and it is urged normally or in idle condition toward one side of the casing by means of any suitably disposed spring 21 indicated herein as being fastened at one end at 22 and having a bearing at its other end against one end of a pin 23 projecting through the pointer parallel to the axis of the pivot 20 and relatively close thereto.

Relatively close to the pointer pivot 20 is another pivot 24 connected to any suitable abutment 25 secured to or otherwise formed on the casing 10, and mounted on the pivot 24 is an actuator 26 somewhat in the nature of a bell-crank, the longer arm 27 of which bears against the other end of the aforesaid pin 23, the bearing edge of the arm 27 being cam shaped. The other and shorter arm 28 of the actuator cooperates with a plunger 29 fitted for sliding movement in a sleeve 30 secured in the hole 16 of the block 15 and locked in such position by the set screw 17. The end of the plunger bearing against the arm 28 is relatively flat, while the other end of the plunger has a depression in what may be called the form of a circular cam 31. The cams at 27 and 31 are so designed as to produce equal intervals on the scale at 11, irrespective of the direction of movement of the several parts calculated to actuate the member 19.

The sleeve 30 has at its inner end a flange 32 adapted to seat against the inner surface of the block 15, and the other or outer end 33 of the sleeve is of hemi-spherical form constituting a socket-bearing for the ball portion 34 of the contact member 35.

The contact member includes a shank 36 extending inward from the ball 34 and has constant bearing contact with the depressed cam end of the plunger. The outer end portion of the contact member extends outward loosely through a hole 37 in the socket 33 and has a rounded extremity 38. The contact member is adapted for universal movement with respect to the sleeve, it being movable bodily longitudinally along the axis of the sleeve when pressure is brought to bear against the rounded end 38, causing the inner end of the shank 36 to move the plunger toward the actuator causing a movement of the actuator around its pivot 24 and causing the pointer to sweep over the scale 11 with a greatly multiplied value with respect to the extent of movement of the contact member. During this action the inner end of the shank 36 remains in the center of the depression 31, and the ball simply slides along the sleeve. If, however, force is applied laterally to the rounded end 38 in any direction perpendicular to its axis or approximately so the contact member is caused to oscillate around the center of the ball, and the inner end of the shank 36 wipes correspondingly laterally over the circular cam 31 toward the side of the sleeve, causing again the projection of the plunger 29 toward the actuator and with a resulting sweep of the pointer over the scale as before. All of these movements of the contact member and actuator are resisted gently by the spring 21.

Any suitable means, well understood by a machinist, may be employed to support the indicator above described. In order to establish practically universal adjustment means for the indicator I show a supporting head 39 in the hole 40 of which is fitted the sleeve 30, the sleeve and parts carried in connection therewith being adjustable in said hole 40 around the axis of the sleeve to any desired position and there locked by such means as a set screw 41. The other end of the head 39 is provided with a screw 42 upon which is fitted the eye portion 43 of an arm 44 where it is locked by a thumb nut 45, thus clamping the arm at any desired position around the axis of the screw 42. The arm 44 in turn is shown held in a clamp 46 which may assume any desired angular position with respect to the axis of the arm. The clamp in turn is fitted upon an upright 47 and locked in place by such means as a thumb nut 48 so as to fix the position of the indicator around the axis of the upright. To the upright is attached a bar 49 adapted to be secured in any well known manner to any convenient support. Thus the indicator is adapted for universal adjustment as well as for universal actuation of the micrometer pointer.

It will be noted that the sleeve constitutes a companion bearing member for the contact member for oscillation of the latter around the center of the ball as well as for longitudinal bodily movement of the contact member. The sleeve is easily removable from the casing 10, and after being so removed longer and shorter fingers 50 and 51 are attachable directly to the inner and outer end portions of the contact member, respectively, as by means of screw threads 52 and 53 formed on the contact member adjacent to the inner and outer sides of the ball. It is to be understood that the ball portion need not be a full sphere in order to accomplish the results above indicated, the outer half thereof being sufficient for ordinary purposes. With the device adjusted as shown in Fig. 5 and with the sleeve suitably supported in any relatively fixed support, the point of the finger 51 on being applied to the center of the shaft whose alignment is to be tested, the point of the longer finger 50 will remain stationary or sweep around in a larger or smaller circle according to the correctness of the centering of the shaft, thus establishing the usefulness of the device as a lathe test indicator.

I claim:

1. The herein described test indicator comprising a sleeve having a spherical socket-bearing in one end, a contact member including a bearing portion of spherical form fitted in said socket and adapted for universal movement therein, with respect to the axis of the sleeve, and means co-operating with the contact member to indicate movements of the contact member with respect to the sleeve.

2. In a test indicator of the character set forth, the combination of a cylindrical sleeve, means to support the sleeve in relatively fixed position, a plunger fitted for sliding movements in the sleeve, a contact member having a portion shaped for universal movement in the sleeve with respect to the axis thereof and having a shank in contact with the plunger, and pointer means associated with the plunger and caused by the movement of the plunger along the sleeve to indicate the extent of movement relatively of the contact member.

3. A test indicator as set forth in claim 1 including supporting means for the indicator adapting the same for universal adjustment as to position.

4. A device as set forth in claim 2 in which the plunger is provided with a cam shaped surface with which the shank end of the contact member co-operates.

5. A device as set forth in claim 2 in which the plunger is provided with a depression in one end in the form of a circular cam with which the end of the contact member shank has constant bearing contact.

6. The herein described test indicator comprising a casing including an arc shaped scale, a pointer pivoted in the casing and adapted to sweep over said scale, means acting on the pointer tending to hold it in a certain position, an actuator pivoted in the casing adjacent to the pointer and adapted to move the same from the position aforesaid, a plunger movable toward the actuator in a direction perpendicular to the axis of the latter, and a universally movable contact member having constant bearing contact with one end of the plunger to cause movement thereof and of the actuator.

7. A device as set forth in claim 6 in which the pointer is provided with a single pin parallel to the pivot of the pointer and against which the actuator bears even though the contact member be moved in opposite directions.

8. A device as set forth in claim 6 in which the pointer is provided with a pin projecting therethrough parallel to its pivot, and means for holding the pointer in idle position acting on one end of the pin, while the actuator acts upon the other end of the pin.

9. A device as set forth in claim 6 in which the actuator is a bell-crank having longer and shorter arms, the longer arm bearing against the pointer while the shorter arm co-operates with the plunger.

10. A device as set forth in claim 6 in which the actuator is in the nature of a bell-crank having longer and shorter arms, the longer arm having a cam shaped bearing surface, and the pointer is provided with a single pin co-operating with said bearing surface irrespective of the direction of movement of the contact member.

In testimony whereof I affix my signature.

RALPH MIOLLA.